(12) United States Patent
Xu et al.

(10) Patent No.: US 10,913,363 B2
(45) Date of Patent: Feb. 9, 2021

(54) VOLTAGE INJECTION-BASED CABLE SWAP DETECTION

(71) Applicant: Ford Global Technologies, LLC, Dearborn, MI (US)

(72) Inventors: Wei Xu, Canton, MI (US); Fazal Urrahman Syed, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1177 days.

(21) Appl. No.: 14/643,195

(22) Filed: Mar. 10, 2015

(65) Prior Publication Data
US 2016/0268944 A1 Sep. 15, 2016

(51) Int. Cl.
| | | |
|---|---|---|
| *H02P 27/08* | (2006.01) | |
| *H02P 7/03* | (2016.01) | |
| *B60L 15/20* | (2006.01) | |
| *B60L 15/02* | (2006.01) | |
| *B60L 50/16* | (2019.01) | |

(52) U.S. Cl.
CPC .......... *B60L 15/20* (2013.01); *B60L 15/025* (2013.01); *B60L 50/16* (2019.02); *B60L 2240/427* (2013.01); *B60L 2240/429* (2013.01); *B60L 2260/44* (2013.01); *Y02T 10/64* (2013.01); *Y02T 10/70* (2013.01); *Y02T 10/7072* (2013.01); *Y02T 10/72* (2013.01)

(58) Field of Classification Search
CPC ................................. G07C 3/146; G07C 5/085
See application file for complete search history.

(56) References Cited

U.S. PATENT DOCUMENTS

| | | | | |
|---|---|---|---|---|
| 6,140,789 | A | * 10/2000 | Kachi ............... | G05B 19/4062 318/603 |
| 2002/0044464 | A1 | 4/2002 | Deng et al. | |
| 2008/0111429 | A1* | 5/2008 | Rowell ............... | H02H 11/004 307/127 |
| 2013/0270974 | A1* | 10/2013 | Wang ................. | B60L 3/0069 310/68 R |

OTHER PUBLICATIONS

Alan V. Oppenheim, Signals and systems, 1983, MIT Opencourseware, p. 11-3.*

* cited by examiner

*Primary Examiner* — Eduardo Colon Santana
*Assistant Examiner* — Charles S Laughlin
(74) *Attorney, Agent, or Firm* — David B. Kelley; Brooks Kushman PC (57) ABSTRACT

A vehicle includes an electric machine and a controller configured to inject a voltage into the electric machine. The controller measures the currents caused by the voltage and processes the currents using a discrete Fourier transform to determine positive and negative sequence currents. A phase rotation sequence is identified by comparing the sequence currents to expected positive and negative sequence currents that are associated with possible phase rotation sequences. The electric machine may be controlled according to the identified phase rotation sequence. A cable swapped diagnostic may be output when the phase rotation sequence is different than an expected phase rotation sequence.

20 Claims, 4 Drawing Sheets

VOLTAGE INJECTION-BASED CABLE SWAP DETECTION

TECHNICAL FIELD

This application generally relates to detecting a swapped cable connection to an electric machine.

BACKGROUND

A hybrid-electric or all-electric vehicle includes one or more electric machines that are used for vehicle propulsion. The electric machines operate with relatively large voltages and currents when compared to a traditional 12 Volt vehicle power system. A high voltage system may monitor the connection status of the electric machines. A typical electric machine may be a three-phase motor and include connection of three conductors between the electric machine and a power inverter. The electric machine rotates in a direction that is based on a phase rotation sequence of the voltage or current applied to the conductors. The vehicle may include a controller that monitors the connection to detect if the conductors are connected between the proper terminals. The controller may monitor a direction of rotation after applying a voltage of a magnitude sufficient to cause rotation of the electric machine. The controller may flag an issue if the direction of rotation is different than an expected direction of rotation.

SUMMARY

In one possible configuration, a vehicle includes a controller programmed to, in response to a power-on condition, inject a voltage having a predetermined phase rotation sequence into a three-phase electric machine and output a signal indicative of a phase rotation sequence based on a comparison of predetermined sequence current magnitudes and sequence current magnitudes associated with a current flowing through the three-phase electric machine. The controller may be further programmed to, in response to the signal indicating that the phase rotation sequence is different than the predetermined phase rotation sequence, output a cable swapped diagnostic. The predetermined sequence current magnitudes may be based on an inductance of the three-phase electric machine. The predetermined sequence current magnitudes may be based on a magnitude of the voltage. The predetermined sequence current magnitudes may be based on a frequency of the voltage. The sequence current magnitudes associated with the current may be derived from a discrete Fourier transform of measurements of the current. The controller may be further programmed to operate the three-phase electric machine according to the signal to cause the three-phase electric machine to rotate in a predetermined direction corresponding to the predetermined phase rotation sequence. The voltage may have a predetermined frequency and a predetermined magnitude such that the three-phase electric machine does not rotate when the voltage is injected. The power-on condition may include a speed of the vehicle being approximately zero and a torque request to the three-phase electric machine being approximately zero. The predetermined sequence current magnitudes may include sequence current magnitudes associated with the predetermined phase rotation sequence.

In another possible configuration, a vehicle includes an electric machine that rotates in a predetermined direction in response to application of a predetermined phase rotation sequence. The vehicle further includes a controller programmed to inject a voltage with the predetermined phase rotation sequence into the electric machine and output a signal indicative of a phase rotation sequence based on a comparison of predetermined sequence current magnitudes and sequence current magnitudes associated with a current caused by a voltage. The vehicle of claim 11 wherein the controller is further programmed to, in response to the signal indicating that the phase rotation sequence is different than the predetermined phase rotation sequence, output a cable swapped diagnostic. The controller may be further programmed to, in response to the signal indicating that the phase rotation sequence is different than the predetermined phase rotation sequence, disable operation of the electric machine. The controller may be further programmed to operate the electric machine according to the signal indicative of the phase rotation sequence to cause the electric machine to rotate in a predetermined direction corresponding to the predetermined phase rotation sequence. The predetermined sequence current magnitudes may be based on one or more of an inductance of the electric machine, a magnitude of the voltage, and a frequency of the voltage.

A method, implemented by a controller, includes applying voltage to an electric machine based on an injection voltage reference and operating the electric machine based on a phase rotation sequence derived from a comparison of predetermined sequence current magnitudes and sequence current magnitudes associated with a current caused by the voltage. The predetermined sequence current magnitudes may be based on parameters of the injection voltage reference and parameters of the electric machine. The sequence current magnitudes may be based on a discrete Fourier transform of measurements of the current. The frequency of the injection voltage reference may be a predetermined multiple of a switching frequency corresponding to a rate at which the voltage is changed. The method may further include outputting, by the controller, a cable swapped diagnostic in response to the phase rotation sequence being different than an expected phase rotation sequence.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
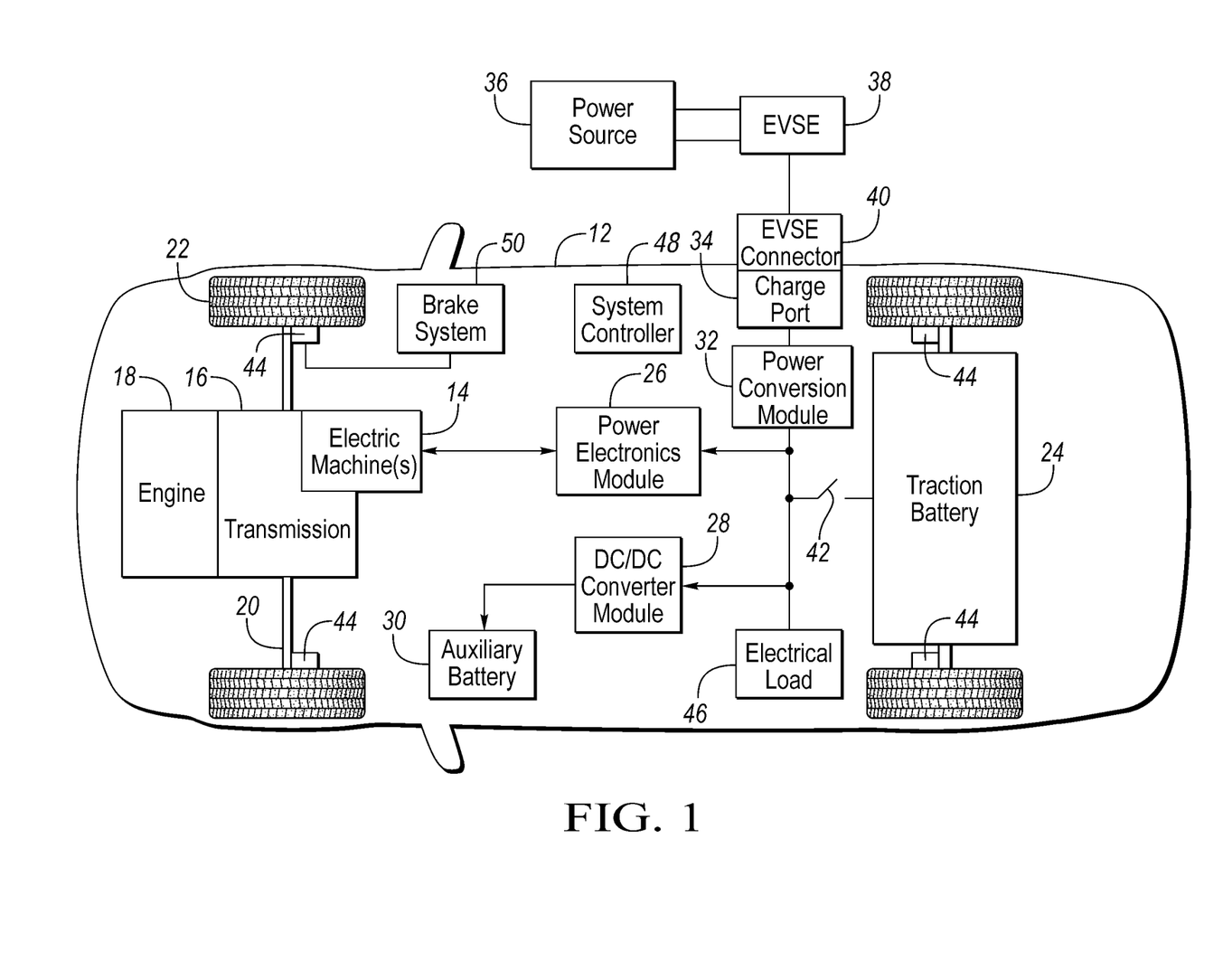
FIG. 1 is a diagram of a hybrid vehicle illustrating typical drivetrain and energy storage components.

FIG. 1 depicts a typical plug-in hybrid-electric vehicle (PHEV). A typical plug-in hybrid-electric vehicle 12 may comprise one or more electric machines 14 mechanically coupled to a hybrid transmission 16. The electric machines 14 may be capable of operating as a motor or a generator. In addition, the hybrid transmission 16 is mechanically coupled to an engine 18. The hybrid transmission 16 is also mechanically coupled to a drive shaft 20 that is mechanically coupled to the wheels 22. The electric machines 14 may provide propulsion and deceleration capability when the engine 18 is turned on or off. The electric machines 14 may also act as generators and may provide fuel economy benefits by recovering energy that would be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that may be used by the electric machines 14. A vehicle battery pack 24 may provide a high voltage DC output. The traction battery 24 may be electrically coupled to one or more power electronics modules 26. The power electronics module 26 may also be referred to as a power inverter. One or more contactors 42 may isolate the traction battery 24 from other components when opened and couple the traction battery 24 to other components when closed. The power electronics module 26 may also be electrically coupled to the electric machines 14 and provide the ability to bi-directionally transfer energy between the traction battery 24 and the electric machines 14. For example, a traction battery 24 may provide a DC voltage while the electric machines 14 may operate using a three-phase AC current. The power electronics module 26 may convert the DC voltage to a three-phase AC current for use by the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the fraction battery 24 may provide energy for other vehicle electrical systems. A vehicle may include a DC/DC converter module 28 that converts the high voltage DC output of the traction battery 24 to a low voltage DC supply that is compatible with other low-voltage vehicle loads. An output of the DC/DC converter module 28 may be electrically coupled to an auxiliary battery 30 (e.g., 12V battery). Other high-voltage loads 46, such as compressors and electric heaters, may be coupled to the high-voltage output of the traction batter 24.

The vehicle 12 may be an electric vehicle or a plug-in hybrid vehicle in which the fraction battery 24 may be recharged by an external power source 36. The external power source 36 may be a connection to an electrical outlet. The external power source 36 may be an electrical power distribution network or grid as provided by an electric utility company. The external power source 36 may be electrically coupled to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically coupled to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically coupled may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 may be coupled to the high-voltage bus. The electrical loads 46 may have an associated controller that operates and controls the electrical loads 46 when appropriate. Examples of electrical loads 46 may be a heating module or an air-conditioning module.

The various components discussed may have one or more associated controllers to control and monitor the operation of the components. The controllers may communicate via a serial bus (e.g., Controller Area Network (CAN)) or via discrete conductors. A system controller 48 may be present to coordinate the operation of the various components.

Figure 2:
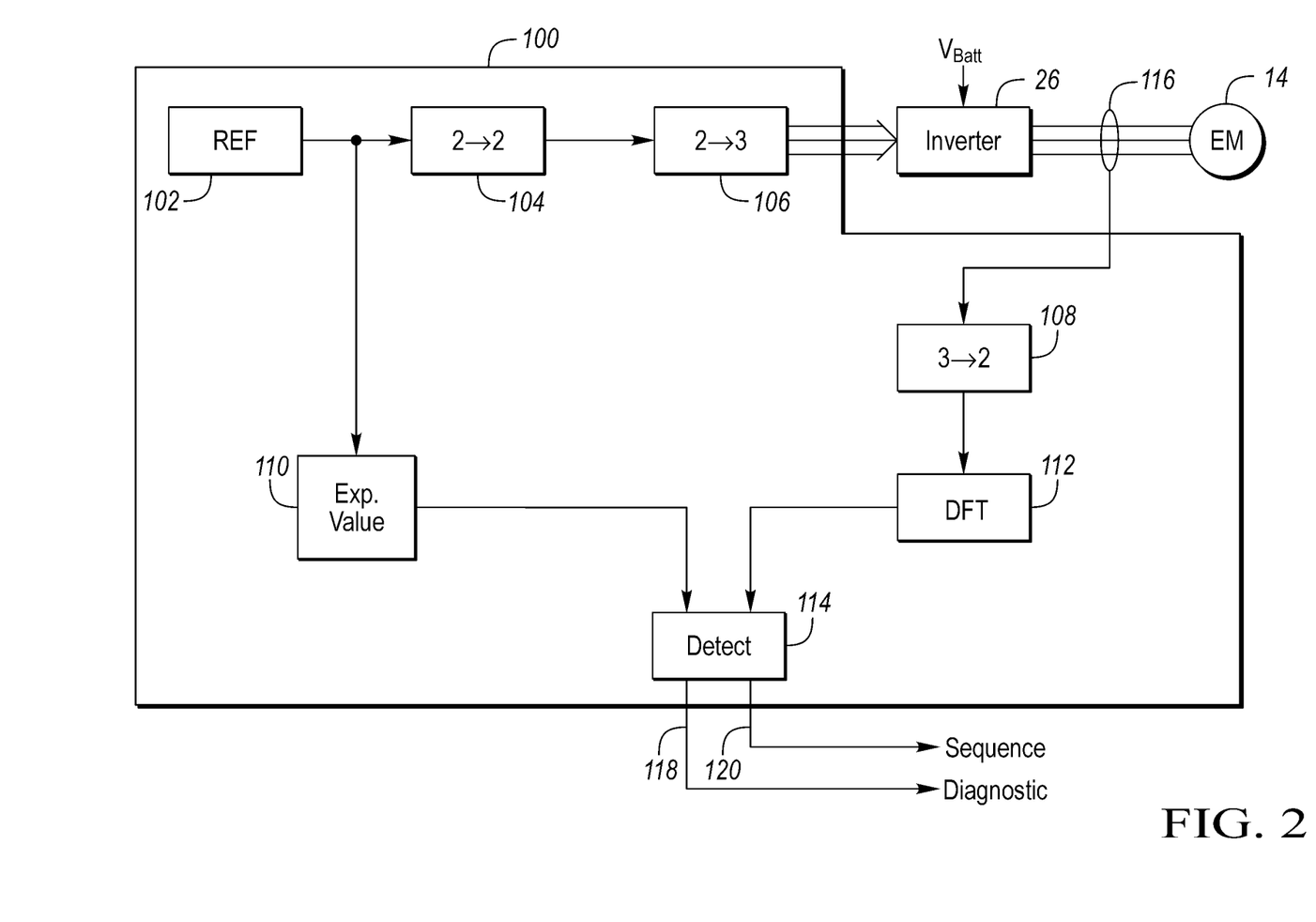
FIG. 2 is a block diagram of an exemplary controls configuration for detecting a phase rotation sequence between an electric machine and a power inverter.

The electric machine 14 may be coupled to the power electronics module 26 via one or more conductors. FIG. 2 depicts a block diagram of control logic that may be implemented in a controller 100. The vehicle 12 may include one or more controllers 100 to control the power electronics module 26. The conductors may be part of a wiring harness between the electric machine 14 and the power electronics module 26. A three-phase electric machine 14 may have three conductors coupled to the power electronics module 26. The controller 100 may implement a strategy to detect that the conductors are properly connected between the electric machine 14 and the power electronics module 26.

An electric machine 14 may be controlled via signals provided by the power electronics module 26 (also referred to as the power inverter). The torque output of the electric machine 14 may be controlled by controlling a current output of the power electronics module 26. The power electronics module 26 may convert a DC voltage input to an alternating three-phase voltage and current output to the electric machine 14. Well-known motor control strategies are available to transform the three-phase voltages into signals more suitable for control purposes.

The power electronics module 26 may be controlled to provide sinusoidal voltage and current signals to the electric machine 14. When the electric machine 14 is being controlled for propulsion, the frequency of the signals may be proportional to the rotational speed of the electric machine 14. When the electric machine 14 is not being used for propulsion, signals may be injected for the purpose of checking the wiring connection. The injected signals may have an amplitude and frequency that does not cause the electric machine 14 to rotate. The frequency of the injected signals may be selected to by a relatively high frequency that is greater than an expected operational frequency during propulsion. Further, the amplitude of the injected signals may be sufficiently small so as to minimize shock hazards and minimize rotation of the electric machine 14.

Before operating the electric machine 14 for propulsion, a sequence of operations may be performed to ensure that the electric machine 14 is coupled properly to the power electronics module 26. An electric machine 14 may be configured to rotate in a particular direction when a voltage or current having a particular phase rotation sequence is applied. The phase rotation sequence may define the relative phase angles between the signals applied to each of the conductors. A voltage may be applied to the terminals of the electric machine 14 to produce a current in the electric machine 14. The current may be a signal of relatively high frequency and relatively low amplitude in order to minimize any rotation or motion of the electric machine 14.

The controller 100 may be configured to adjust the voltage and current output of the power electronics module 26 at a predetermined switching frequency. The switching frequency may be the rate at which the states of switching devices within the power electronics module 26 are changed. The frequency of the injection voltage may be selected as a predetermined multiple of the switching frequency. The predetermined multiple may be a value between 10 and 20.

The power electronics module 26 may be configured to provide a voltage to the electric machine 14 that results in a current flowing through the electric machine 14. The controller 100 may implement a field-oriented control scheme to control the electric machine 14. Field-oriented control of electric machines 14 is well-known in the art so only limited aspects may be described herein.

Field-oriented electric machine control may define an alternate coordinate system for controlling voltages and currents of the electric machine 14. The coordinate system selected allows for simpler control logic than the three-phase coordinate system of the electric machine 14. The selected coordinate system may transform the three-phase alternating voltage and currents into a coordinate system in which the voltages and currents are represented by DC voltages and currents. The transformation to DC values allows for more effective controls to be implemented.

The vehicle 12 may include one or more current sensors 116 to measure current in one or more of the phases of the electric machine 14. In some configurations, two current sensors are utilized and the third phase current is calculated from the two measured currents. The controller 100 associated with the power electronics module 26 may sample the current sensors at a predetermined sampling rate. Measurement values for the phase currents of the electric machine 14 may be stored in controller memory for later computations.

The three phase values may be transformed into a two-axis coordinate system using one or more coordinate transformations. The three phase values may be measured or calculated values. For example, in field-oriented electric machine control, coordinate transformations, such as the Park and Clarke coordinate transformations, are well known. The output of one coordinate transformation may be a vector in a stationary two-axis reference frame. One possible transformation from the three-phase quantities is the Clarke transformation which may be expressed as $$\begin{bmatrix} X_\alpha \\ X_\beta \end{bmatrix} = \begin{bmatrix} \frac{2}{3} & \frac{-1}{3} & \frac{-1}{3} \\ 0 & \frac{2}{\sqrt{3}} & \frac{-2}{\sqrt{3}} \end{bmatrix} \begin{bmatrix} X_a \\ X_b \\ X_c \end{bmatrix} \quad (1)$$

where $X_a$, $X_b$, and $X_c$ are the three-phase values which may represent a current or voltage.

The Clarke transformation converts a three-phase system into the stationary two-axis reference frame. For control purposes, it may be desired to perform calculations with respect to a two-axis reference frame that rotates with respect to the stationary frame. One possible transformation is the Park transformation which may be expressed as $$\begin{bmatrix} X_d \\ X_q \end{bmatrix} = \begin{bmatrix} \cos(\theta) & \sin(\theta) \\ -\sin(\theta) & \cos(\theta) \end{bmatrix} \begin{bmatrix} X_\alpha \\ X_\beta \end{bmatrix} \quad (2)$$

where $\theta$ is the angle of the rotating frame with respect to the stationary frame. The rotating reference frame proves useful for motor control purposes as a rotating reference frame may be chosen in which the d-axis and q-axis values behave as DC values instead of alternating values. For example, a current vector having a d-component and a q-component may be utilized for controlling the current in the electric machine 14. The d-component may represent a flux component, and the q-component may represent a torque component.

The flux and torque of the electric machine 14 may be controlled by adjusting the d-component and the q-component of the voltage or current. A flux controller may be implemented to adjust the d-component. The flux controller may input an error between a reference flux current and the measured flux current (d-component). The flux controller may output a d-component voltage command that may achieve the reference flux current. A torque controller may be implemented to adjust the q-component. The torque controller may input an error between a reference torque current and the measured torque current (q-component). The torque controller may output a q-component voltage command that may achieve the reference torque current.

The advantage of the rotating reference frame is evident when considering a three-phase sinusoid having a constant amplitude and frequency. In the stationary two-axis reference frame, the $X_\alpha$, and $X_\beta$ components will vary at the frequency of the sinusoidal signal. The same signal may be represented in a rotating reference frame that rotates at the same constant frequency. In the rotating reference frame, the $X_d$ and $X_q$ components will appear to be constant values.

Quantities in the rotating reference frame may be returned to the stationary reference frame by the inverse of the Park transformation which may be expressed as $$\begin{bmatrix} X_\alpha \\ X_\beta \end{bmatrix} = \begin{bmatrix} \cos(\theta) & -\sin(\theta) \\ \sin(\theta) & \cos(\theta) \end{bmatrix} \begin{bmatrix} X_d \\ X_q \end{bmatrix} \quad (3)$$

A quantity in the stationary two-axis reference frame may be returned to the three-phase frame using the inverse of the Clarke transformation which may be expressed as $$\begin{bmatrix} X_a \\ X_b \\ X_c \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} X_\alpha \\ X_\beta \end{bmatrix} \quad (4)$$

The description above represents one possible coordinate transformation scheme. Other transformations are possible. In actual implementation, the transformation matrices may be combined to reduce the number of computations required.

An electric machine 14 may include a stator and a rotor. The power electronics module 26 may cause a current to flow in the stator windings. The stator current induces a current in the rotor windings. The resulting interaction between the stator and rotor currents may cause a torque on the rotor. The torque may cause the rotor to increase or decrease rotational speed. The stator and rotor currents may have different amplitudes and frequencies.

In some configurations, the controller 100 may be a component of the inverter 26. A reference voltage 102 may be defined and injected into the electrical machine 14. The reference voltage may be a high-frequency, low-amplitude voltage waveform. The reference voltage 102 may be injected under conditions in which an output shaft of the electric machine 14 is not already rotating and the electric machine 14 is not otherwise being controlled with current. The controller 100 may monitor a signal from a position sensor coupled to the electric machine 14 to determine if the output shaft of the electric machine 14 is rotating. The output shaft of the electric machine 14 may be considered to be stationary if the speed of the electric machine 14 is less than a predetermined speed or approximately zero.

The reference voltage 102 may be injected during a power-on condition. The power-on condition may include a period of time immediately following an ignition key cycle. This period of time would be expected to be while the vehicle 12 is in a standstill condition. The standstill condition may be when a speed of the vehicle 12 is approximately zero. The reference voltage injection 102 may also be generated after a service procedure as a result of a diagnostic command received from a service tool.

The injection reference voltage 102 in the stationary reference frame may be expressed as $$V_{HFI} = V_c e^{j\omega_c t} \quad (5)$$

where $V_c$ is an amplitude of the rotating voltage vector, and $\omega_c$ is the frequency of the rotating voltage vector. In the stationary reference frame, the injection voltage may be a vector of magnitude $V_c$ that rotates at the frequency $\omega_c$. The $V_\alpha$ component may be $V_c \cos(\omega_c t)$ and the $V_\beta$ component may be $V_c \sin(\omega_c t)$.

The stationary reference frame may be further transformed into a reference frame that rotates at the frequency of the injection voltage. The transformation to the injection signal reference frame may be based on the following equations (similar to Equation (2)):

$$V_{q\_HFI} = V_\beta \cos(\theta_c) - V_\alpha \sin(\theta_c) \quad (6)$$

$$V_{d\_HFI} = V_\beta \sin(\theta_c) - V_\alpha \cos(\theta_c) \quad (6)$$

where $\theta_c$ represents an angular position of the injection voltage which may be derived from the injection voltage frequency and the sampling time. This operation may be represented by block 104.

Equations (6) and (7) may be used to convert the injection voltage from the stationary reference frame to a reference frame that rotates with the injection voltage (also referred to as the injection voltage reference frame). In the injection voltage reference frame, the injection voltage of equation (5) may appear as a vector having a fixed d-component and a fixed q-component. Also note that the three phase currents may be transformed to the injection voltage reference frame using a combined transformation. The d-component voltage and the q-component voltage commands may represent a $V_{dq}$ voltage command vector.

The dq-coordinates of the stator reference frame may be transformed to the three-phase voltages using the inverse Clarke transformation (represented by block 106). Note that the transformation in blocks 104 and 106 may be combined into one step in which the operations are combined to yield a transformation from the stationary reference frame to the three-phase values. The three-phase voltages will differ in phase from one another according to the phase rotation sequence.

The three phase voltage commands may be provided to the inverter 26. The inverter 26 may control a pulse width modulated (PWM) output signal to associated switching devices to control the voltage of each phase according to the voltage commands. The resulting voltages may cause current to flow in the three phases of the electric machine 14. The current that flows in the electric machine 14 may depend on the magnitude and frequency of the injection voltage and the impedance of the electric machine 14.

Three-phase voltages and currents may be described by a positive sequence component, a negative sequence component, and a zero sequence component. The positive sequence voltage or current will have a magnitude and frequency based on the three-phase voltage or current. A vector representing the positive sequence component will rotate in a first direction. The negative sequence voltage or current will have magnitude and frequency based on the three-phase voltage or current. However, a vector representing the negative sequence component will rotate in a direction opposite to the first direction at which the positive sequence vector rotates.

The resulting current in each phase may be measured using the current sensors 116 and converted to the stationary reference frame as described above. The resulting current due to the injection voltage may be expressed as the sum of the positive sequence voltage, the negative sequence voltage, and the zero sequence voltage. The sum may be converted to the dq-coordinate system as described above. The transformation from three-phase to two-phase is represented by block 108. The current response to the injected voltage has saliency information embedded and may be represented as $$I_{dqs}{}^s = I_{cp} e^{j(\omega_c t - \pi/2)} + I_{cn} e^{j(-\omega_c t - \pi/2 + 2\theta_r)} \quad (8)$$

where $I_{cp}$ and $I_{cn}$ represent a magnitude of the positive and negative sequence currents respectively, and $\theta_r$ is an angular position of the rotor.

The magnitude of the positive and negative sequence current components may be estimated using a discrete Fourier transform (DFT), represented by block 112, on the current measurement signal. The estimated magnitude of the positive and negative sequence currents may be compared to expected values derived from parameters of the electric machine 14 and parameters of the injected voltage.

The negative and positive sequence current components may be derived from the DFT 116. For the positive sequence current, the DFT 112 may be expressed as $$X_k = \Sigma_{n=0}^{N-1} x_n * e^{-j2\pi f_c T_s} \quad (9)$$

where N is the number of samples to be used based on detection requirements, $f_c$ is the frequency of the injected current, $T_s$ is the sampling interval, $x_n$ is the sampled current of complex vector $I_{qds}$, and $X_k$ is the output of the DFT 112. The output $X_k$ may be a complex number from which an amplitude and a phase component may be derived.

For the negative sequence current, the DFT 112 may be expressed as $$X_k = \Sigma_{n=0}^{N-1} x_n * e^{j2\pi f_c T_s} \quad (10)$$

The equation is slightly different because the frequency for the negative sequence is in the opposite direction. That is, the negative sequence component rotates in a direction opposite to the positive sequence component.

The output of the DFT 112 may be a complex number and may be converted to a value having an amplitude and a phase. The amplitude of the DFT output may be expressed as $$|X_k| = \sqrt{Re(X_k)^2 + Im(X_k)^2}/N \quad (11)$$

where Re( ) is the real portion of the complex value and Im( ) is the imaginary portion of the complex value.

In a three-phase system, the phases of the voltage are separated by 120 degrees. The phases may be labeled as a, b, and c. For example, a normal phase rotation sequence may be denoted as abc, where a, b, and c denote one of the three-phase signals. A normal phase rotation sequence, abc, may be such that the peak value of phase a is observed first, the peak value of phase b is observed a time corresponding to 120 degrees later, and the peak value of phase c may be observed at a time corresponding to 120 degrees later that the peak of phase b is observed.

In the event of a swapped cable, the system may no longer be connected with the normal abc phase rotation sequence. For example, if the phase b and phase c connections are swapped, there is a phase rotation sequence of acb. In this case, the observation times of the peak values of the phase b and phase c waveforms are swapped. The phase rotation sequence of the signals provided to the electric machine 14 determines the direction of rotation of the electric machine 14. Therefore, an electric machine 14 connected with a phase rotation sequence of abc will rotate in a direction opposite to one connected with a phase rotation sequence of acb when operated with the same voltage waveform.

It is apparent that a swapped connection may alter the phase rotation sequence and may cause the electric machine 14 to rotate in a direction different than intended. Such a condition may have a serious impact on performance and safety. There is a potential that the phase rotation sequence could be altered during a service operation or during production. A robust system design should be able to at least detect an improper phase rotation sequence and either compensate for this situation or inhibit operation of the electric machine 14 until remedied.

The output of each DFT 112 may be the positive and negative sequence current magnitude. The positive and negative sequence currents may be predicted as represented by block 110. Assuming a normal connection (e.g., abc sequence) between the power inverter 26 and the electric machine 14, the expected current magnitudes of the positive and negative sequence components may be expressed as $$I_{pos} = \frac{V_c(L_d + L_q)}{2L_d L_q \omega_c} \quad (12)$$

$$I_{neg} = \frac{V_c(L_q - L_d)}{2L_d L_q \omega_c} \quad (13)$$

where $V_c$ is the magnitude of the injection voltage, and $\omega_c$ is the frequency of the injection voltage, $L_d$ and $L_q$ are a dq-axis inductance for the electric machine under a non-saturated operating condition, and $I_{pos}$ and $I_{neg}$ are the expected positive and negative sequence current magnitudes. When the connections between the electric machine 14 and the power electronics module 26 are connected with the expected phase rotation sequence, the predicted values (from 110) and the actual values from the DFT 112 should be relatively close in magnitude.

In the situation in which three-phase connections between the power inverter 26 and the electric machine 14 are swapped, the positive and negative sequence current magnitudes may have different values. The positive and negative sequence magnitudes for cables connected in an acb arrangement are:

$$I_{pos} = \frac{V_c(L_d - L_q)}{2L_d L_q \omega_c} \quad (14)$$

$$I_{neg} = \frac{V_c(L_q + L_d)}{2L_d L_q \omega_c} \quad (15)$$

The positive and negative sequence magnitudes for cables connected in a bca arrangement are:

$$I_{pos} = \frac{V_c(L_d - L_q)(1 + \sqrt{3})}{4L_d L_q \omega_c} \quad (16)$$

$$I_{neg} = \frac{V_c(L_q + L_d)(1 + \sqrt{3})}{4L_d L_q \omega_c} \quad (17)$$

The positive and negative sequence magnitudes for cables connected in a bac arrangement are:

$$I_{pos} = \frac{V_c(L_d + L_q)(1 + \sqrt{3})}{4L_d L_q \omega_c} \quad (18)$$

$$I_{neg} = \frac{V_c(L_q - L_d)(1 + \sqrt{3})}{4L_d L_q \omega_c} \quad (19)$$

The positive and negative sequence magnitudes for cables connected in a cab arrangement are:

$$I_{pos} = \frac{V_c(L_d + L_q)(1 + \sqrt{3})}{4L_d L_q \omega_c} \quad (20)$$

-continued $$I_{neg} = \frac{V_c(L_q - L_d)(1 - \sqrt{3})}{4L_dL_q\omega_c} \quad (21)$$

The positive and negative sequence magnitudes for cables connected in a cba arrangement are:

$$I_{pos} = \frac{V_c(L_d - L_q)(1 - \sqrt{3})}{4L_dL_q\omega_c} \quad (22)$$

$$I_{neg} = \frac{V_c(L_q + L_d)(1 + \sqrt{3})}{4L_dL_q\omega_c} \quad (23)$$

The output of the DFT 112 for the positive and negative sequence magnitudes may be compared to the associated expected magnitude (output from block 110). The comparison and detection may be represented by block 114. A difference between the voltage command value from the DFT 112 and the associated expected value (from 110) may be computed for each of the positive and negative sequence terms. If a magnitude of either difference is greater than a predetermined threshold, then a swapped cable diagnostic 118 may be output.

In some configurations, the DFT output may be compared to each of the expected positive and negative sequence magnitudes (equations 12-23). The phase rotation sequence may be the positive and negative sequence magnitudes that are closest to the sequence magnitudes output from the DFT. The phase rotation sequence associated with the expected sequence magnitudes that are closest to the actual sequence magnitudes may be output as the phase rotation sequence output 120. The phase rotation sequence output 120 may be encoded into six distinct values to represent each possible phase rotation sequence.

Figure 3:
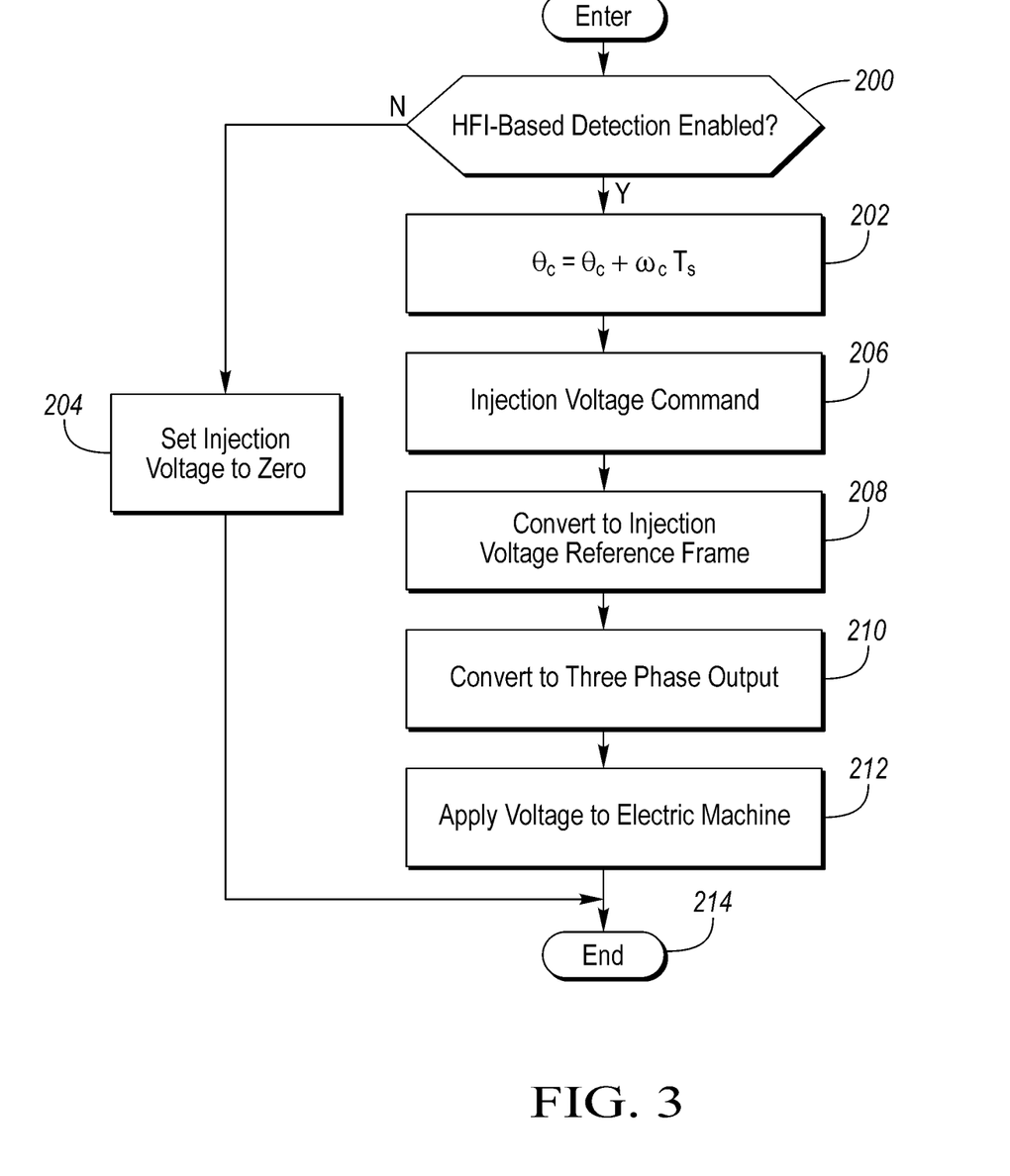
FIG. 3 is a flowchart of an exemplary sequence of operations for injecting a voltage into an electric machine.

The detection system may be comprised of an injection routine and a detection routine. FIG. 3 depicts an exemplary flowchart of operations that may be implemented as part of the injection routine. The injection routine may inject the injection voltage into the electric machine 14. The controller 100 may perform operation 200 to determine if the cable swap detection logic is enabled or allowed to be performed. One condition may be that the electric machine 14 is not otherwise commanded and is at zero speed. If it is determined that the detection is not enabled, operation 204 may be performed to set the injection voltage to zero.

If it is determined that the cable swap detection is enabled, the controller 100 may then perform operation 202 to update the injection voltage phase angle. The phase angle may be updated by an amount based on the injection frequency and the sampling rate. The controller 100 may then perform operation 206 to calculate the injected voltage command as described herein. The injected voltage command may be in the coordinates of the injection signal reference frame.

Operation 208 may be performed to transform the injected voltage command into the injection voltage reference frame as described herein. Operation 210 may be performed to transform the voltage output in dq-coordinates to a three-phase voltage command as described herein. Operation 212 may be performed to translate the voltage output command to an appropriate switching pattern and apply the switching pattern to the electric machine 14. The injection process for the given iteration may end at operation 214. The process may be continually repeated at the specified sampling rate.

Figure 4:
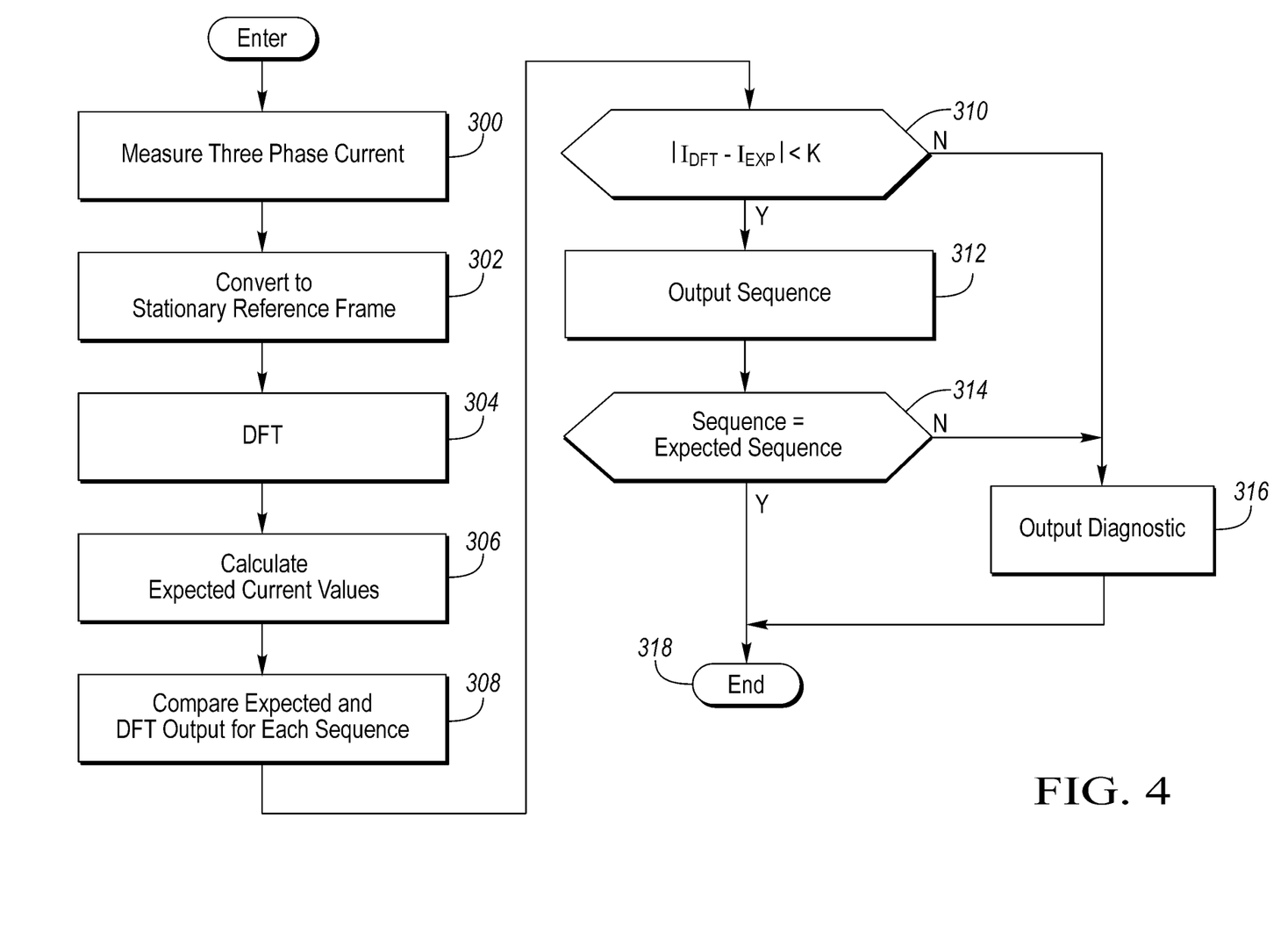
FIG. 4 is a flowchart of an exemplary sequence of operations for detecting a phase rotation sequence.

FIG. 4 depicts an exemplary flowchart of a sequence of operations that may be performed as part of the detection routine. The detection routine may be performed at a different sampling rate than the injection routine. The DFT may use a number of current measurement samples to generate an output. The current samples may be collected at a faster sample rate and then processed at a later time. The controller 100 may execute instructions at operation 300 to sample and store the three-phase currents via the current sensors 116. At operation 302, the three-phase currents may be transformed to the stationary reference frame. At operation 304, the DFT may be executed to determine the positive and negative sequence currents of the measured currents. At operation 306, the expected positive and negative sequence current magnitudes may be computed. The magnitude for the positive and negative sequence current from the DFT may be compared to the expected positive and negative sequence current at operation 308. The comparison may be performed for each possible phase rotation sequence.

At decision block 310, the magnitude of the differences between the actual DFT sequence currents and each of the expected sequence currents may be compared to a predetermined threshold. If the magnitude is less than the predetermined threshold for one of the expected sequence currents then operation 312 may be performed to output the phase rotation sequence associated with the expected sequence current. If the magnitude is greater than the predetermined threshold for all of the expected sequence currents, then operation 316 may be performed to set the cable swapped diagnostic.

Once the phase rotation sequence is identified, operation 314 may be executed to compare the computed phase rotation sequence to an expected phase rotation sequence. If the phase rotation sequence is the same as the expected phase rotation sequence, execution may be completed 318. If the phase rotation sequence is different than the expected phase rotation sequence then the cable swapped diagnostic may be output at operation 316.

The cable swapped diagnostic may store a diagnostic trouble code (DTC) in the non-volatile memory of the controller. The cable swapped diagnostic may cause the power electronics module 26 to disable outputs to the affected electric machine 14. The disabling of the output may prevent voltage and current from being applied at the output of the power electronics module 26 for propulsion purposes. The cable swapped diagnostic may be indicated to the operator via a lamp or a warning message in a display.

The phase rotation sequence may be output and may be utilized to alter the control of the electric machine 14. The voltages and currents applied to the electric machine 14 may be modified to compensate for the phase rotation sequence. In this manner, rotation of the electric machine may still be maintained in the expected direction. The power inverter 26 may be configured to adjust the relative phases of the output voltages to compensate for the swapped connection to the electric machine 14.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a controller programmed to, in response to a power-on condition, cause an inverter to inject a voltage having a predetermined phase rotation sequence into an electric machine and measure resulting current via a current sensor, and output a signal identifying a phase rotation sequence corresponding to one of a plurality of pairs of predetermined sequence current magnitudes that are closest in value to sequence current magnitudes derived from the current.

2. The vehicle of claim 1 wherein the controller is further programmed to, in response to the signal indicating that the phase rotation sequence is different than the predetermined phase rotation sequence, output a cable swapped diagnostic.

3. The vehicle of claim 1 wherein the predetermined sequence current magnitudes are based on an inductance of the electric machine.

4. The vehicle of claim 1 wherein the predetermined sequence current magnitudes are based on a magnitude of the voltage.

5. The vehicle of claim 1 wherein the predetermined sequence current magnitudes are based on a frequency of the voltage.

6. The vehicle of claim 1 wherein the sequence current magnitudes associated are further derived from a discrete Fourier transform of the current.

7. The vehicle of claim 1 wherein the controller is further programmed to operate the inverter and the electric machine according to the signal to cause the electric machine to rotate in a predetermined direction corresponding to the predetermined phase rotation sequence.

8. The vehicle of claim 1 wherein the voltage has a predetermined frequency and a predetermined magnitude such that the electric machine does not rotate when the voltage is injected.

9. The vehicle of claim 1 wherein the power-on condition includes a speed of the vehicle being approximately zero and a torque request to the electric machine being approximately zero.

10. The vehicle of claim 1 wherein the predetermined sequence current magnitudes include sequence current magnitudes associated with the predetermined phase rotation sequence.

11. A vehicle comprising:
an electric machine that rotates in a predetermined direction in response to application of a predetermined phase rotation sequence;
an inverter configured to provide voltage to the electric machine; and
a controller programmed to cause the inverter to inject a voltage with the predetermined phase rotation sequence into the electric machine and output a signal identifying a phase rotation sequence corresponding to one of a plurality of pairs of predetermined sequence current magnitudes that are closest in value to sequence current magnitudes associated with a current caused by the voltage and measured by a current sensor.

12. The vehicle of claim 11 wherein the controller is further programmed to, in response to the signal indicating that the phase rotation sequence is different than the predetermined phase rotation sequence, output a cable swapped diagnostic.

13. The vehicle of claim 11 wherein the controller is further programmed to, in response to the signal indicating that the phase rotation sequence is different than the predetermined phase rotation sequence, disable operation of the electric machine.

14. The vehicle of claim 11 wherein the controller is further programmed to operate the electric machine according to the signal to cause the electric machine to rotate in a predetermined direction corresponding to the predetermined phase rotation sequence.

15. The vehicle of claim 11 wherein the predetermined sequence current magnitudes are based on one or more of an inductance of the electric machine, a magnitude of the voltage, and a frequency of the voltage.

16. A method comprising:
applying, by a controller and an inverter, voltage having a predetermined phase rotation sequence to an electric machine and identify a phase rotation sequence corresponding to one of a plurality of pairs of predetermined sequence current magnitudes that are closest in value to sequence current magnitudes derived from electric machine current measurements; and
operating, by the controller and the inverter, the electric machine according to the phase rotation sequence.

17. The method of claim 16 wherein the predetermined sequence current magnitudes are based on parameters of the voltage and parameters of the electric machine.

18. The method of claim 16 wherein the sequence current magnitudes are based on a discrete Fourier transform of electric machine current measurements.

19. The method of claim 16 wherein a frequency of the voltage that is applied is a predetermined multiple of a switching frequency corresponding to a rate at which the voltage is changed.

20. The method of claim 16 further comprising outputting, by the controller, a cable swapped diagnostic in response to the phase rotation sequence being different than an expected phase rotation sequence.

\* \* \* \* \*